(12) United States Patent
Amos

(10) Patent No.: US 6,519,040 B1
(45) Date of Patent: Feb. 11, 2003

(54) IMAGING SYSTEM AND METHOD FOR FOURIER TRANSFORM SPECTROSCOPY

(76) Inventor: William Bradshaw Amos, 54 Cravendish Avenue, Cambridge CB1 4UT (GB)

(*) Notice: Subject to any disclaimer, the term of this patent is extended or adjusted under 35 U.S.C. 154(b) by 0 days.

(21) Appl. No.: 09/463,796
(22) PCT Filed: Jul. 27, 1998
(86) PCT No.: PCT/GB98/02236
§ 371 (c)(1), (2), (4) Date: May 8, 2000
(87) PCT Pub. No.: WO99/06807
PCT Pub. Date: Feb. 11, 1999

(30) Foreign Application Priority Data

Jul. 29, 1997 (GB) .............................. 9715914
Dec. 31, 1997 (GB) .............................. 9727505

(51) Int. Cl.[7] .................................... G01B 9/02
(52) U.S. Cl. ........................... 356/453; 356/456
(58) Field of Search .............. 356/453, 456, 356/491; 250/339.08

(56) References Cited

U.S. PATENT DOCUMENTS 4,905,169 A * 2/1990 Buican et al. .............. 356/453

FOREIGN PATENT DOCUMENTS

| DE | 40 16 731 A | 11/1991 |
| EP | 0 499 074 A | 8/1992 |
| GB | 2 245 381 A | 1/1992 |
| WO | WO 96 00887 A | 1/1996 |

OTHER PUBLICATIONS

Kazuyoshi Itoh, Takashi Inoue, Takashi Ohta, and Yoshiki Ichioka, "Liquid–Crystal Imaging Fourier–Spectrometer Array", Optics Letters, vol. 15, No. 11, dated Jun. 1, 1980.

* cited by examiner

Primary Examiner—Samuel A. Turner
(74) Attorney, Agent, or Firm—Cantor Colburn LLP

(57) ABSTRACT

Fourier Transform Spectroscopy is performed using a birefringent device to vary path difference systematically for all regions of an image simultaneously, so that a separate interferogram is collected for each image region by combining intensity values in multiple images. The optics may allow a theoretical efficiency of 100% in light throughout.

19 Claims, 5 Drawing Sheets

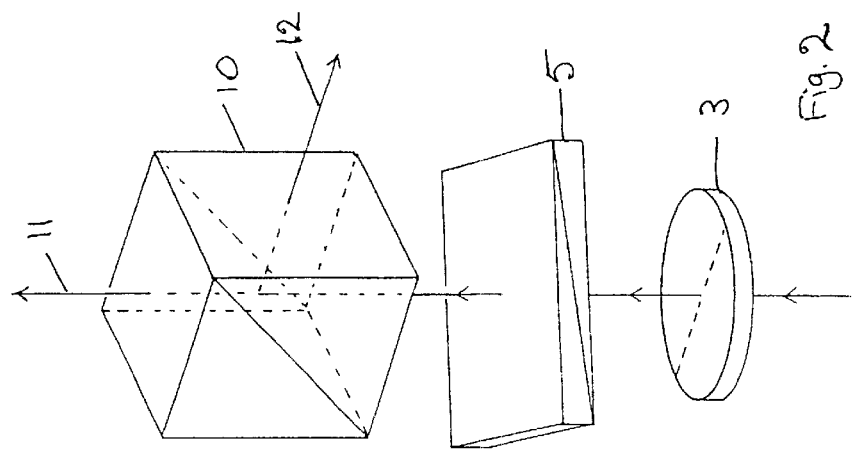
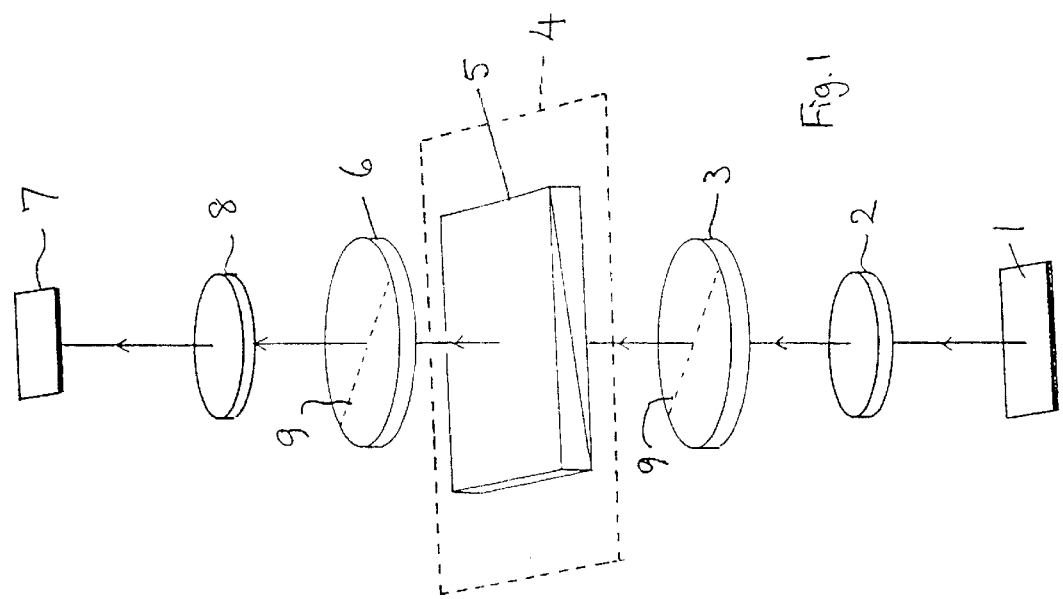

IMAGING SYSTEM AND METHOD FOR FOURIER TRANSFORM SPECTROSCOPY

FIELD OF THE INVENTION

This invention relates to an optical imaging Fourier spectrometer and method of operating it.

BACKGROUND OF THE INVENTION

Fourier transform spectroscopy (FTS) is a long-established method for obtaining the absorption or emission spectra of substances. In this method, light from a specimen is passed to a detector via an optical interferometer, often of the Michelson type. The light intensity at the output is measured while the length of the light path in one arm of the interferometer is varied. The spectrum is then obtained by computation as the reverse Fourier transform of the intensity profile as described by R. J. Bell (1972) in the textbook *Introductory Fourier Transform Spectroscopy* published by Academic Press, New York. Recently, a novel form of FTS has been described by Yuval Garini and others in U.S. Pat. No. 5,539,517; also in Chapter 4, pp 87–124, of *Fluorescence Imaging Spectroscopy and Microscopy* edited by Xue Wang and Brian Herman, Chemical Analysis Series, Volume 137 published by John Wiley & Sons Inc.

In the latter, a field (which may be a microscope image) is imaged in a camera, using light that has passed through a Sagnac interferometer. During the recording, the interferometer is adjusted in such a way that a series of interference fringes passes in a precise and controlled fashion across the field of the camera and is recorded. This series corresponds, in the case of an initial input of white light, to Newton's series. With this apparatus, it is possible to obtain by means of a computer, an independent Fourier transform spectrum for each pixel of the set of images obtained. This information is of potential value in many applications, but it has notably been applied to the detection of multiple coloured fluorescent dyes bound to biological specimens in a light microscope.

The prior art works well, but suffers from two defects. Firstly, the position of the fringes in the interferometer is sensitive to very small displacements of the optical elements, corresponding to shifts of the order of a wavelength of light. This makes the Sagnac system difficult to align and to keep in alignment during transport. Secondly, the transmission efficiency of the Sagnac system is maximally only fifty percent, since half of the light put into it passes back towards the source: this is an intrinsic property of this type of interferometer. The present invention offers the possibility of improvement in both these respects.

Minami in *Mikrochim. Acta* [*Wien*] 1987, III, 309–324 has discussed the use of birefringent optical techniques rather than an interferometer in analysis of an aperture source. Here, instead of a physical difference in optical path length it is the retardation due to birefringence that is varied. However, he lacks the capacity to record any image of a field.

Although Minami uses a CCD camera to image the fringe system in his spectrometer, he is using it to record one-dimensional information; there is no image of a field, whether coincident with that of the fringe system or otherwise. The resulting interferogram allows analysis of the spectral quality of light gathered by a condenser lens onto a circular aperture but does not allow spectral information to be obtained simultaneously from multiple regions of a field so that, for example, comparisons can be made of one region with another.

SUMMARY OF THE INVENTION

According to the invention, imaging FTS is carried out in an apparatus wherein at least one birefringent device is placed in an optical light path between polarizing devices, with image-generating and—recording apparatus respectively before and after the polarizing devices, the image-generating apparatus generating a real image in the same plane or planes as fringes generated by the birefringent device(s), and means for causing change in the optical path difference suffered by light in the birefringent device(s).

In this way there can be a systematic change due to variation in optical retardation throughout the recorded images in a controlled fashion, so that the Fourier spectrum of each element "pixel" of an image-recording camera can be obtained by known means of computation, from the variation in intensity of the elements across the set of recorded images.

In other words, FTS is performed using a birefringent device to vary the optical path difference systematically for all regions of an image simultaneously, so that a separate interferogram is collected for each image region by combining intensity values in multiple images.

The invention includes an embodiment in which the Wollaston prism, quartz wedge or other birefringent device or devices are fabricated such that the optical slow direction is at an angle to the mechanical long axis.

There may be complementary optical paths with a common image-generating apparatus and at least one common image-recording apparatus; in this case it is advantageous to use birefringent devices with a slow direction at 45° to the mechanical long axis in the respective paths. This allows the fringe system to be produced and caused to move without the necessity for quarter-wave plates or any other additional optical elements. A polarizing beamsplitter is preferred as the polarizer on the recording side of the birefringent device.

The invention also includes a method of generating a Fourier transform in imaging spectrometry which includes passing light from a field (which may be a real image) through a polarizer to form a real image in the same plane as the fringes of a birefringent device through which the light passes, and then through a second polarizer to an image-receiver, controlledly varying the optical path difference in the birefringent device, recording the variation of intensity in the receiver in relation to the variation of optical path difference, and computing the Fourier spectrum of the elements of the recorded images.

The advantage of the general design and method over the interferometer-based prior art is its lack of sensitivity to mechanical and thermal stress and to errors in the placement of its mechanical parts while allowing the analysis of information from the whole of a field. For example, in those embodiments which have fringes crossing the image, by appropriate choice of the wedge angles and/or dimensions of a birefringent element, the fringe separation can be made as large as desired. Compared with the interferometer, the direction and separation of the fringes are almost completely insensitive to environmental influences and to misplacements of the optics. Also, the fringes can be translated without any need for high mechanical precision in the slide or screw mechanism. In the preferred embodiment, a marker, e.g. in the form of a line, is fixed on or near the moveable birefringent optical element and moves with it in such a way as to indicate the position of the fringe system either via the image in a camera or through the action of some other type of sensor, switch or mechanical device. This marker serves as a guide to the identification of the so-called "zero order fringe" or centre of the fringe pattern and so facilitates computation of spectra from a series of recorded images. Since the position of the fringes in the prior art of Garini et al is not determined by the position of any single optical element such a marker cannot easily be incorporated into the prior art.

It is also possible, in certain embodiments, for the optical efficiency to approach 100 per cent.

DESCRIPTION OF PARTICULAR EMBODIMENTS

Further features and advantages of the invention will be apparent from the following description of embodiments, making reference to the accompanying drawings, in which:

FIG. 1 is a simple embodiment, introducing the principle of the use of a single birefringent device;

FIG. 2 shows how an improvement in optical transmission efficiency can be gained by the use of a polarizing beamsplitter;

Figure 3:
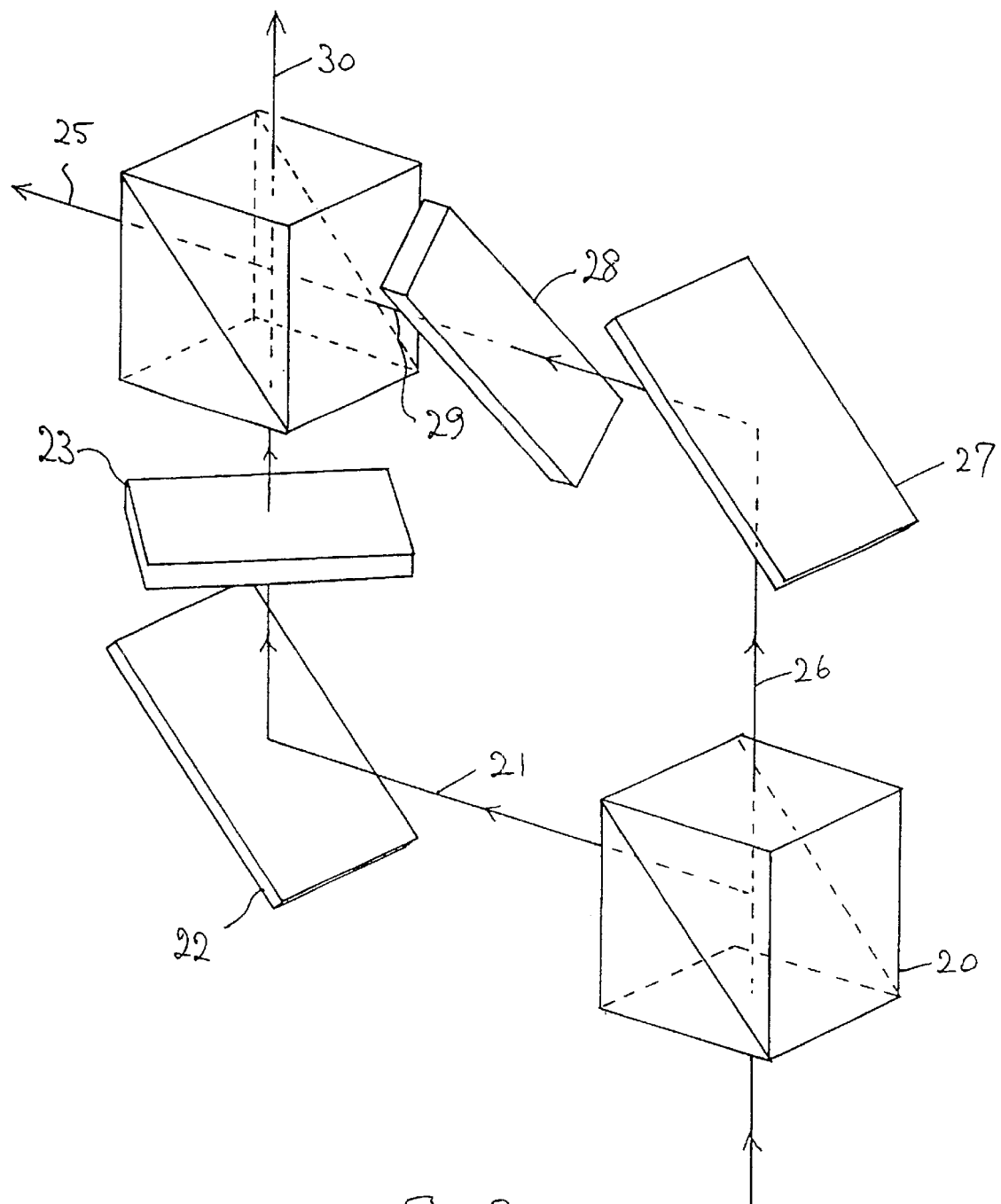
FIG. 3 shows how, by the use of two birefringent devices and the addition of a further polarizing beamsplitter, the optical efficiency can be increased to nearly 100 per cent.

Lenses (including microscope lenses) responsible for producing an aerial real image of the field of view within or close to the birefringent component, in the same plane as fringes formed by it due to the light passing through it, and for relaying an optically-modified form of that real image to the photosensitive surface of a camera or cameras are not necessarily shown, but their presence is to be assumed in all the embodiments. It is also assumed that the initial state of the light entering the apparatus is unpolarised.

Also in all the Figures and accompanying descriptions the birefringent component is shown and referred to as a Wollaston prism, this being the preferred form. A Wollaston prism is a birefringent optical component consisting of two birefringent prisms cemented together as described by Hecht, E. in the textbook *Optics* (Second Edition, 1989) published by Addison-Wesley.

Light entering the Wollaston prism is divided into two differently-polarized components, but if the light enters at any point on a central line these components undergo zero relative retardation due to birefringence. The retardation increases maximally across the prism along a direction perpendicular to the aforesaid line: this latter direction will be here referred to, in accordance with normal optical practice, as the shear direction.

The appearance of a Wollaston prism in polychromatic light between crossed polarizers is that it is traversed by evenly-spaced parallel fringes with a dark fringe in the region of least retardation in the centre of the prism. The fringes run at 90° to the shear direction and the fringe pattern may be displaced in the examples given here by translating the Wollaston prism in the direction of shear.

However, other types of birefringent component are envisaged as alternatives to the Wollaston within the scope of the invention. For example, a simple wedge of birefringent material, or a combination of a wedge and a parallel-sided birefringent plate, might be preferred on grounds of cost or because an asymmetrical fringe pattern was preferred.

A Rochon prism or some form of Wollaston in which the optic axes were oriented in such a way as to shift the position of the fringes along the optical axis might be used, for example, to allow the fringe system to be slightly displaced from the surface of the prism so that small defects, dust particles etc, on the prism could be placed out of focus. However, the real image will always be formed in the same plane as the fringe system.

A large variety of known optical birefrigent devices, including a Soleil compensator could be used to produce a uniform field rather than a fringe pattern. In the case of the Soleil compensator, wedges of birefringent material are relatively shifted mechanically to produce, uniformly over the entire field, the same changes in optical retardation as occur across the field with the Wollaston prism.

The invention equipped with a birefringent component of the Soleil type may be regarded as a form in which the fringes are expanded to fill the entire image.

The invention also includes the use of birefringent electro-optical devices which are modulated electronically to alter the optical path difference within them by the use of liquid crystallization, photoelasticity or other effects, so obviating the need for moving parts.

In the simplest embodiment shown in FIG. 1, an object light passes from an object field 1 through a lens 2 through a linear polarizing filter 3 to an image plane 4 which lies close to or within a Wollaston prism 5. From this prism, the light then passes to a second linear polarizer 6 which serves as an analyser.

In accordance with well-known principles governing the behaviour of light that has passed through birefringent materials, interference occurs at the analyser 6. If the light is passed from the analyser into the photosensitive target 7 of a camera, such as a CCD TV camera, equipped with a suitable lens 8, a relayed form image of the real image in the plane 4 close to or within the Wollaston prism is formed on the photosensitive surface of the camera.

In this image, a white fringe occupies the central region of the Wollaston and a series of coloured fringes appears on each side. To produce such a pattern the arrangement of the polarization directions of 3 and 6 is parallel (as indicated by the dotted lines 9 in FIG. 1) and at 45° to the shear direction of the Wollaston prism. This arrangement is preferred to the more conventional "crossed" configuration of the polarizers, because a bright fringe-free image is produced when the Wollaston 5 is removed from the optical path or replaced by a non-birefringent slab of glass. This fringe-free image, in the same plane as the fringes, can be used for conventional monochromatic recording by the camera.

The displacement of fringes to form the set of images required for Fourier analysis is accomplished by linear translation of the Wollaston in the direction of shear (i.e. along the "long axis" of the Wollaston 5—right and left as depicted in FIG. 1).

FIG. 2 shows an arrangement which improves on that shown in FIG. 1, in that a polarizing beamsplitter 10 is substituted for the analyser 6.

In this case the light 11 emerging from the beamsplitter 10 in a vertical direction with reference to FIG. 2 can be made to yield an image similar to that in analyser 6 but of slightly higher intensity because of the superior polarizing performance of the beamsplitter, which contains no absorbing material. The ray 12 indicated emerging from the beamsplitter and passing to the right of the Figure is the central ray of a beam from which another image of the Wollaston 5 can be formed, traversed by a pattern of fringes complementary to that formed by the vertical beam.

With reference to the appearance described above for FIG. 1, the image bears a dark fringe at the centre of the Wollaston 5, with a series of bright fringes on each side. It is envisaged that both the vertically and horizontally emitted beams described above could be directed by conventional optical means onto separate areas of the photosensitive surface of the same camera or onto separate cameras. Since both images of each member of the set required for analysis can be used for the computation of the same spectra, there is a gain in sensitivity of at least twofold relative to the arrangement in FIG. 1.

A disadvantage shared by the apparatus in FIG. 1 and FIG. 2 is the absorption of at least half of the incoming light by the polarizer 3. This can be remedied by the arrangement of FIG. 3, in which the polarizer 3 is replaced with a first polarizing beamsplitter 20.

In FIG. 3, a central light ray 21 is drawn reflected out horizontally from 20. A consequence of the operation of the beamsplitter is that this ray is polarized in a horizontal plane. This means that it can be reflected without disturbance of its polarization state by the orthogonal plane reflector 22 and then passes vertically through a first Wollaston prism 23 and then into a second polarizing beamsplitter 24, where a component of the light is reflected (ray 25 passing to the left in FIG. 3). This light yields a "bright-fringe central" pattern due to the presence of the Wollaston 23 with its shear direction at 45° to the polarization direction of a "parallel" polarizer 20 and analyser 24.

The beam 26 passing vertically out of beamsplitter 20 is reflected by plane reflector 27 and then passes through a Wollaston prism 28 constructed and oriented similarly to Wollaston prism 23. A portion of this beam 29 passes straight through beamsplitter 24 and produces the same fringe pattern as that produced by the beam 25. The two patterns are superimposed and reinforce each other in signal strength in the camera focused on them.

Similarly, the complementary fringe pattern formed by light 30 emerging from beamsplitter 24 and passing vertically in the Figure is reinforced by contributions from both Wollastons 23 and 28.

Since there is, in principle, little or no absorption by any of the optical elements in FIG. 3, almost 100 per cent light efficiency can be obtained.

Although the embodiment of FIG. 3 can approach the maximum theoretical efficiency of light transmission and thus the highest possible sensitivity for the spectrometer, it has the difficulty that the two Wollastons must be translated by accurately equal distances but in different directions.

In reference to FIG. 3, they are required to move along the direction of their long axes (perpendicular to the fringe direction) which are at 45° to different faces of beamsplitter 24 and non-parallel. This requires some mechanical complexity in the drive mechanism.

Figure 4:
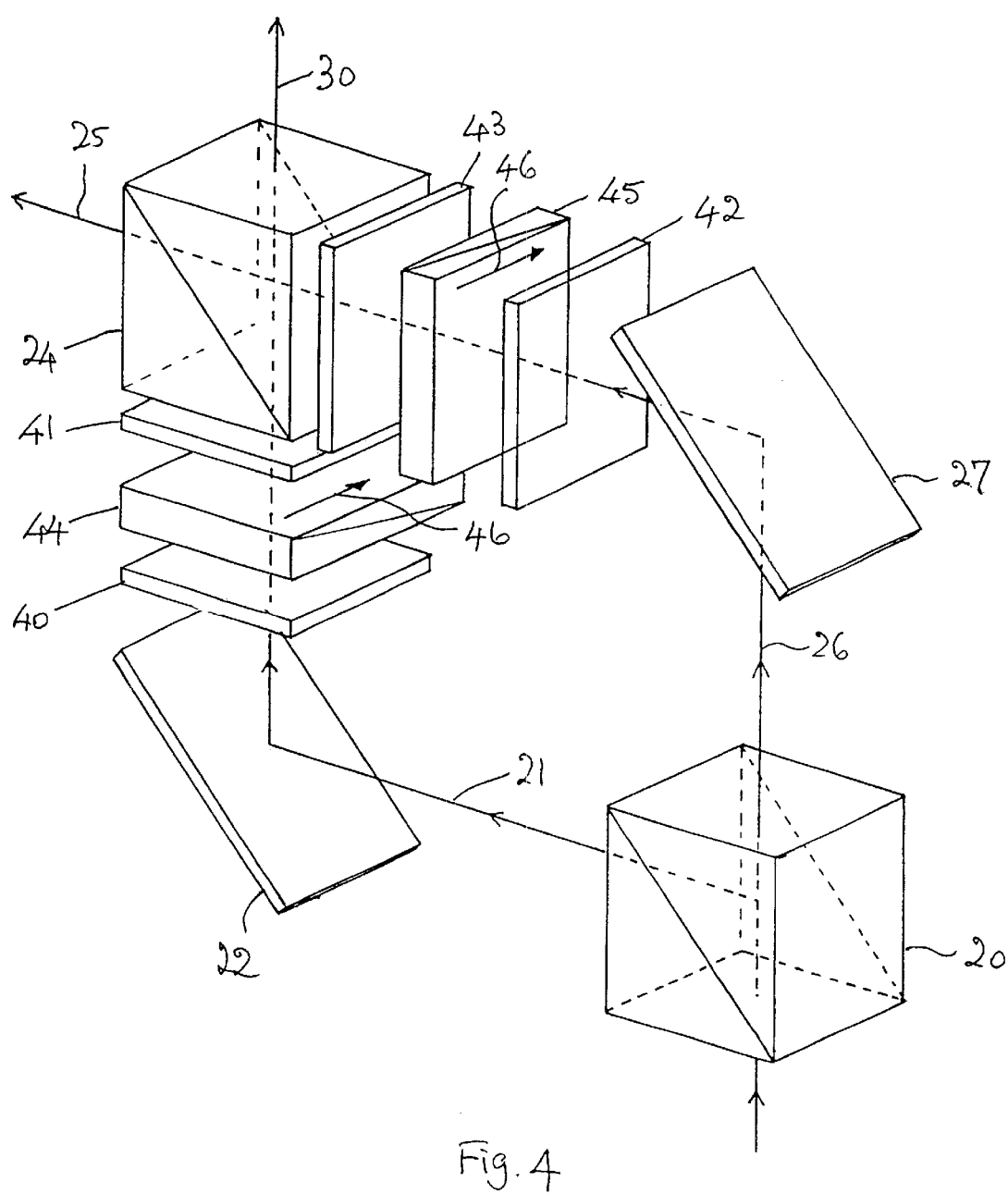
FIG. 4 shows an embodiment in which quarter-wave retarding optical elements are added, to allow a more convenient mechanical arrangement for the birefringent devices.

FIG. 4 shows how this difficulty can be overcome by the addition of quarter-wave birefringent retarding plates 40, 41, 42 and 43 on both sides of respective Wollastons 44 and 45. The beamsplitters 20,24 and reflectors 22,27 are labelled and oriented in FIG. 4 as in FIG. 3. The quarter-wave plates are oriented with their crystalline axes (the so-called slow and fast directions) at 45° to the planes of polarization of beamsplitter 24.

In accordance with well-known optical principles, the effect of the quarter-wave plates 40,42 is to convert the two beamsplitters into circular polarizers. Each Wollaston prism 44,45 is illuminated with circularly polarized light and the light transmitted through each Wollaston encounters, in effect, a circular analyser by passage through first 41 or 43 and then the beamsplitter 24.

With this arrangement, the pattern of fringes produced by the Wollaston becomes independent of the azimuthal position of the Wollaston, and it is possible to modify the design of FIG. 3 by setting the Wollastons in positions such as those shown for 44 and 45 in FIG. 4, where the shear directions in both are parallel. The required translation can then be produced easily by mounting both Wollastons on one block and translating them simultaneously by a single mechanism in the direction shown by the arrows 46 in the Figure. The fringes are then parallel to the edges of beamsplitter 24.

Another embodiment of the invention resembles that of FIG. 4 and is operated in the same way but lacks the quarter-wave plates. In this form, the moveable birefringent components are fabricated in such a way that the optical slow direction in each component is at an angle of 45 degrees to the direction of motion indicated in FIG. 4. The birefringent components are preferably elongated along the direction of motion and so their slow direction is at 45 degrees to their long axis. In this respect they differ from the conventional form of quartz wedge used in current practice of polarising microscopy, which has the slow direction parallel to the long axis. Since it lacks quarter-wave plates this form of the invention is cheaper and has a wider wavelength range than the one described previously and shown in FIG. 4.

Figure 5:
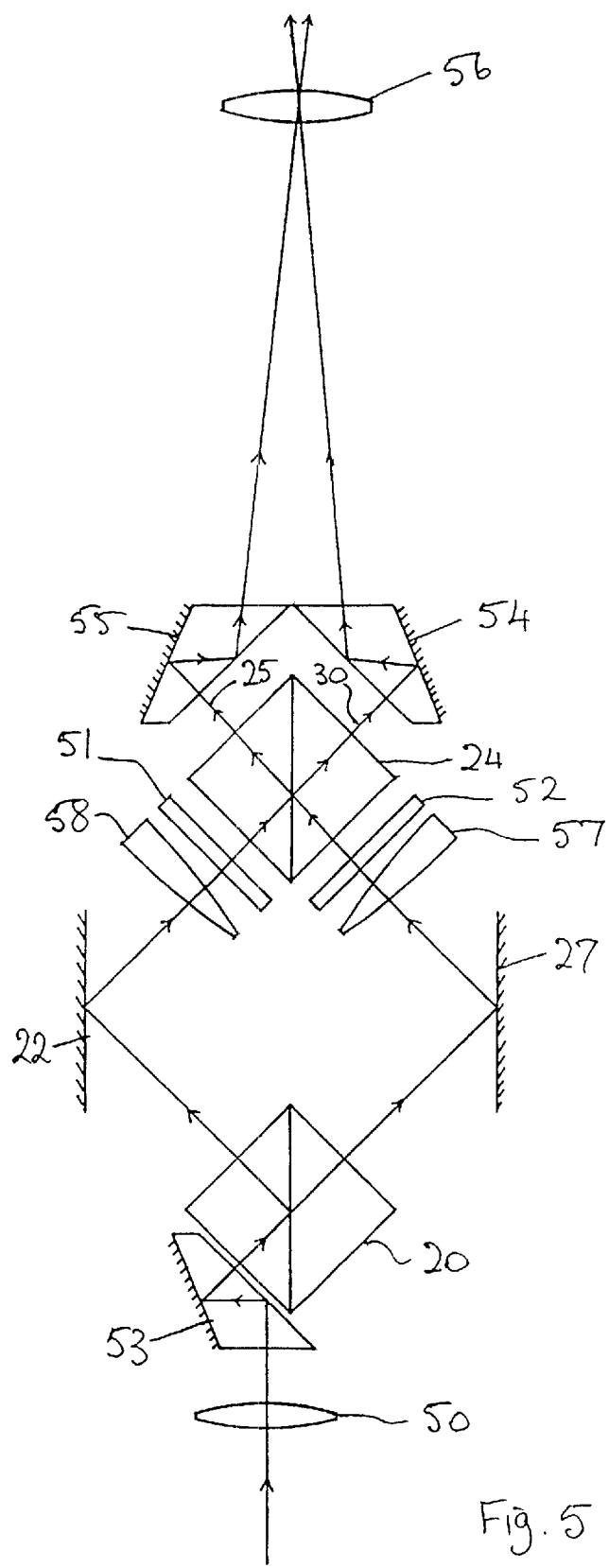
FIG. 5 shows a preferred embodiment, in which angled birefringent devices are used.

FIG. 5 shows how lenses and other optical elements may be included. One such element is an input lens 50 which produces a real image of the field of view in the plane of the moveable birefringent components such as Wollastons 51 and 52.

Another element is the passage of the incoming rays through a 45° reflection prism 53 or similar device, so that the beamsplitter 24 can be placed vertically above beamsplitter 20, which may be preferred for reasons of mechanical balance.

Another feature is the use of 45° reflection prisms 54,55 or similar devices, to bring the beams 25,30 emerging from the output faces of beamsplitter 24 into parallel or near-parallel directions so that they can enter a single lens 56 which forms two adjacent images of the field of view in a camera. Another is the addition of field lenses 57 and 58 with the function of bringing two overlapping images of the exit pupil of lens 50 into the entrance pupil of lens 56, so that, in accordance with well-known optical practice, aberrations and loss of intensity of the images in the camera can be avoided.

Figure 6:
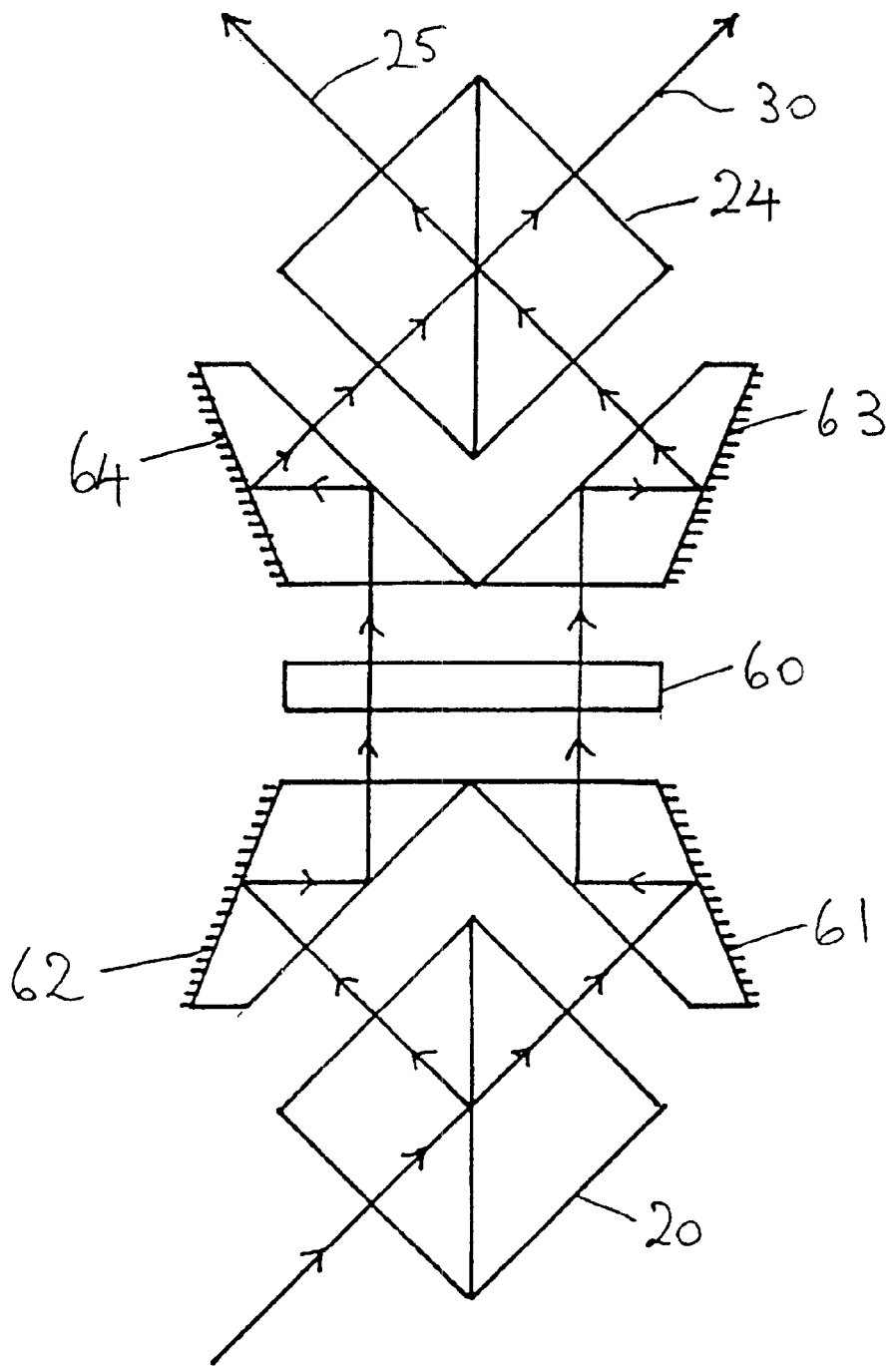
FIG. 6 shows a further embodiment.

In the embodiment of FIG. 6, instead of two birefringent moveable components there is only one, Wollaston 60. In this form, the light divided by beamsplitter 20 is directed, for example by the 45° deviation prisms 61 and 62, through adjacent areas of one and the same birefringent Wollaston prism 60, which may be replaced by a quartz wedge or other similar device, to be brought parallel or near-parallel by reflection prisms 63,64.

In FIG. 6, the birefringent device 60 is translated in a direction perpendicular to the plane of the paper and similar shifts of the fringes are produced simultaneously in the two images. This embodiment has the advantage that a single birefringent device such as 60 is easier and cheaper to fabricate than for embodiments in which two such devices have to be matched to close tolerances to give similar wedge angles, fringe spacing and other properties.

The beams may be reunited in beamsplitter 24 by an arrangement of 45° deviation prisms 63 and 64 similar to 61,62, or can be captured by separate cameras.

Embodiments are also included in the invention in which the beamsplitters themselves are of known birefringent forms such as Savart plates which produce the required lateral displacement of the output beams without the need for the 45° deviation prisms.

Further examples of the invention include the use, instead of ordinary quarter-wave plates, of achromatic quarter-wave plates or Fresnel rhombs with the advantage of an increase in the range of wavelengths over which the spectrometer can be operated.

What is claimed is:

1. An imaging system for Fourier transform spectroscopy comprising:
   an image generating apparatus generating object light along a first optical light path;
   a plurality of polarizing devices placed in the first optical light path;
   at least one birefringent device placed in the first optical light path between the plurality of polarizing devices;
   means for causing change in the optical path difference suffered by light of the first optical light path incident upon the at least one birefringent device;
   an image recording apparatus in the first optical light path receptive of the object light;
   wherein the image generating apparatus generates a real image of a field in the same plane or planes as fringes generated by the at least one birefringent device; and
   a second optical light path perpendicular to the first optical light path wherein the first and second optical light paths have a common image generating apparatus and the image recording apparatus records complementary images.

2. The imaging system according to claim 1 wherein the at least one birefringent device has an optical slow direction subtending an angle to a mechanical long axis of the birefringent device.

3. The imaging system according to claim 2 wherein the angle subtended between the optical slow direction and the mechanical long direction of the at least one birefringent device is 45 degrees.

4. The imaging system according to claim 1 wherein at least one of the plurality of polarizing devices is a polarizing beam splitter.

5. The imaging system according to claim 1 further comprising at least one quarter-wave retarding device positioned in the first and second optical light paths adjacent to the at least one birefringent device.

6. The imaging system according to claim 1 further comprising a marker fixed to the at least one birefringent device.

7. A method of generating a Fourier transform in imaging spectrometry, the method comprising:
   passing light from a field through a polarizing interferometer including:
      an image generating apparatus generating object light along a first optical light path;
      a plurality of polarizing devices placed in the first optical light path;
      at least one birefringent device placed in the first optical light path between the plurality of polarizing devices;
      means for causing change in the optical path difference suffered by light of the first optical light path incident upon the at least one birefringent device;
      an image recording apparatus in the first optical light path receptive of the object light;
      wherein the image generating apparatus generates a real image of a field in the same plane or planes as fringes generated by the at least one birefringent device; and
      a second optical light path perpendicular to the first optical light path wherein the first and second optical light paths have a common image generating apparatus and the image-recording apparatus records complementary images;
   controllably varying the optical path difference in the at least one birefringent device;
   recording the variation of intensity in each part of each complementary image in the the image-recording apparatus in relation to the variation of the optical path difference, and
   computing the Fourier spectrum of the recordings of the images.

8. The method according to claim 7 further comprising:
   fixing a marker to the at least one birefringent device; and
   identifying the position of the zero order fringe with the marker.

9. An imaging system for Fourier transform spectroscopy comprising:
   an image generating apparatus generating object light along a first optical light path;
   a plurality of polarizing devices placed in the first optical light path;
   a single birefringent device placed in the first optical light path between the plurality of polarizing devices;
   means for causing change in the optical path difference suffered by light of the first optical light path incident upon the at least one birefringent device;
   an image recording apparatus in the first optical light path receptive of the object light;
   wherein the image generating apparatus generates a real image of a field in the same plane or planes as fringes generated by the at least one birefringent device; and
   complementary optical paths within the imaging system arranged such that the complementary optical paths each pass through different portions of the single birefringent device.

10. The imaging system according to claim 9 wherein the single birefringent device has an optical slow direction subtending an angle to a mechanical long axis of the single birefringent device.

11. The imaging system according to claim 10 wherein the angle subtended between the optical slow direction and the mechanical long direction of the at least one birefringent device is 45 degrees.

12. The imaging system according to claim 9 wherein at least one of the plurality of polarizing devices is a polarizing beamsplitter.

13. The imaging system according to claim 9 further comprising at least one quarter-wave retarding device positioned in the first and second optical light paths adjacent to the single birefringent device.

14. The imaging system according to claim 9 further comprising a marker fixed to the single birefringent device.

15. An imaging system for Fourier transform spectroscopy comprising:
   an image generating apparatus generating object light along a first optical light path;
   a plurality of polarizing devices placed in the first optical light path;
   at least one moveable birefringent device placed in the first optical light path between the plurality of polarizing devices;
   means for causing change in the optical path difference suffered by light of the first optical light path incident upon the at least one birefringent device;

an image recording apparatus in the first optical light path receptive of the object light;

wherein the image generating apparatus generates a real image of a field in the same plane or planes as fringes generated by the at least one birefringent device; and quarter-wave birefringent retarder plates positioned adjacent to the at lest one moveable birefringent device.

16. The imaging system according to claim 15 wherein the at least one moveable birefringent device has an optical slow direction subtending an angle to a mechanical long axis of the at least one moveable birefringent device.

17. The imaging system according to claim 16 wherein the angle subtended between the optical slow direction and the mechanical long direction of the at least one moveable birefringent device is 45 degrees.

18. The imaging system according to claim 15 wherein at least one of the plurality of polarizing devices is a polarizing beamsplitter.

19. The imaging system according to claim 15 further comprising a marker fixed to the at least one moveable birefringent device.

* * * * *